United States Patent Office 3,150,040
Patented Sept. 22, 1964

3,150,040
O,O-DIMETHYL - O - (4 - CYANOPHENYL)THIONO-PHOSPHATE AND INSECTICIDAL COMPOSITIONS AND METHODS USING SAME
Saichiro Kuramoto and Yoshihiko Nishizawa, Toyonaka-shi, Hideo Sakamoto, Itami-shi, and Toshio Mizutani, Minoo-shi, Japan, assignors to Sumitomo Chemical Company, Ltd., Osaka, Japan, a corporation of Japan
No Drawing. Filed July 11, 1961, Ser. No. 123,100
Claims priority, application Japan Aug. 2, 1960
8 Claims. (Cl. 167—30)

The present invention relates to a new, low toxic organophosphoric acid ester and to the insecticidal composition containing the same. More particularly, the invention relates to O,O-dimethyl-O-(4-cyanophenyl) thionophosphate of the following formula,

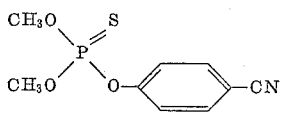

and to the low toxic insecticidal composition containing the said compound as an essential active ingredient. Further, the present invention relates to the method for manufacturing the above mentioned compound comprising condensing O,O-dimethyl chlorothionophosphate and a compound selected from the group consisting of 4-cyanophenol and its alkali metal salts. Furthermore, it relates to the method for killing agricultural injurious insects, especially borers of rice, for example, rice stem borer (*Chilo suppressalis* Walker), paddy borer (*Schoenobius incertellus* Walker), purplish stem borer (*Sesamia inferens* Walker), and others (such as *Chilo plejadellus* Zinck, *Chilotrea polychrysa* Meyr., *Scirpophaga albinella* Cramer, *Scirpophaga innotata* Walker, *Eldana dichromellus* Walker, and *Elasmopalpus lignosellus* Zeller), and sanitary injurious insects, especially house fly (*Musca domestica* Linne), and its larva, and the like.

Accordingly, an object of the present invention is to provide a new organophosphoric acid ester which is very useful as an essential active ingredient of pesticidal composition and further has a characteristic of low order of toxicity. Another object of the invention is to provide an insecticidal composition suitable for agricultural and sanitary uses which has an extremely lower order of toxicity towards warm blooded animals, but has a very higher degree of insecticidal activity, compared with that of the conventional insecticides. Further objects of the present invention is to provide a method for killing various kinds of agricultural and sanitary injurious pests by use of the above-mentioned compound. Other objects and advantages will be apparent from the description hereunder stated.

It has been well known that organo-phosphoric acid esters having 4-nitrophenyl radical therein possess a high degree of insecticidal activity and consequently are very useful as the active ingredient of agricultural chemicals. However, they have, at the same time, a very high degree of toxicity towards warm blooded animals and this is, indeed, the weak point of these compounds. Therefore, many attempts have been made to search the compound having lower toxicity and higher insecticidal activity by the American and the German researchers and compounds such as Chlorthion (Farbenfabriken Bayer A.G.) and Dicapthon (American Cyanamid Co.) have been found as the results of their efforts. However, those so-called low toxic insecticidal compounds have really a certain degree of low toxicity, and so they cannot but be inferior to some extents in their insecticidal activities.

A researcher of Farbenfabriken Bayer A.G. has reported on synthesis of a thiophosphate having cyanophenyl radical, i.e. O,O-diethyl-O-(4-cyanophenyl) thionophosphate, as well as results of the insecticidal tests of this compound, (G. Schrager: Die Entwicklung neue Insekticid auf Grundlage organischer Fluor und Phopshor-Verbindungen, p. 59, 1952). However, this compound has an oral toxicity towards warm blooded animals which is not so different from that of Parathion, while the insecticidal activity towards the injurious insects tested is inferior to that of Parathion. The researches on this compound have not been reported henceforth.

The present inventors have made various studies for the purpose of obtaining the compound which had a low toxicity and also a high degree of insecticidal activity, such compound being anxiously wanted in rice producing districts. As the results, the inventors have succeeded in obtaining the present compound which has not only the extremely low toxicity but also the high activity towards insects, compared with those of any conventional insecticidal compound. Concretely speaking, such compounds as parathion, methyl parathion, EPN (du Pont de Nemours, E. I., and Co.) and Dipterex (Farbenfabriken Bayer A.G.) have been utilized these days as a killing agent for borers of rice. However, even though the preceding three compounds indeed possess the superior insecticidal activities towards borers of rice, they have, at the same time, the high degree of toxicities towards warm blooded animals including human being, for example, the $LD_{50}$ value for mouse oral toxicity, of Parathion being 6–10 mg./kg. of body weight, and therefore, severe attention and careful management should be paid for the handling of the insecticidal compositions containing these compounds. On the other hand, it is true that Dipterex has a considerably lower toxicity towards warm blooded animals, but the insecticidal activity of the compound is inferior in proportion than that of the afore-said three compounds. Roughly speaking, about twice or thrice as much amount as the former compounds would be necessary to attain the same degree of control of borers of rice with the latter compound. Such a larger quantity would not be tolerable from an economical point of view. Consequently, in spite of extreme toxicity towards warm blooded animals, parathion preparations have commonly been utilized as the killing agent for borers of rice up to this time. However, the present compound of the invention, has, as minutely described hereinafter, about 100 times lower toxic effect than that of parathion and about several times lower than that of Dipterex (for example, oral toxicity towards mouse, $LD_{50}$ value, is 900–1000 mg./kg. of body weight), so it may be said that the compound is substantially non-toxic. Moreover, as minutely described hereinafter with numerical values, the efficacy of the compound to borers of rice is not at all inferior to parathion, therefore it may fairly be said that the controlling problem of borers of rice comes to a perfect solution in fact by the appearance of the present invention.

O,O-dimethyl-O-(4-cyanophenyl) thionophosphate of the present invention is a new compound unknown in any preceding literatures. In order to produce the compound according to the method of the invention, as shown in the following scheme of reaction

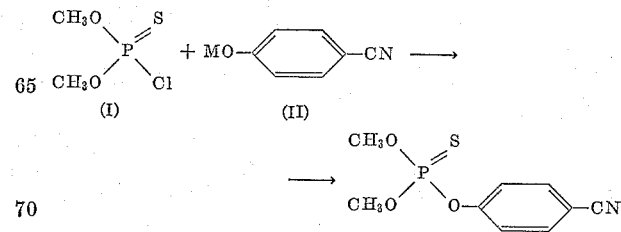

(wherein M stands for hydrogen or an alkali metal atom),

O,O-dimethyl chlorothionophosphate (I) is condensed with a compound selected from the group consisting of 4-cyanophenol and its alkali metal salts (II).

O,O-dimethyl chlorothionophosphate utilized in the present process as a raw material is the known liquid compound and possesses the characteristic of B.P. 66° C./16 mm. Hg. 4-cyanophenol utilized as another raw material is also prepared by any known method, for example by the method disclosed in J. Chem. Soc., 1942, 113, having M.P. 110° C., and the compound may easily be converted to the salts by reacting the phenol with a compound such as caustic alkali, alkali carbonate, alkali metals and alkali metal alcoholates in water or an organic solvent. As for the said alkali, sodium or potassium is preferable.

In the method of this invention, the condensation reaction of these raw materials may successfully be carried out by mixing the both parties at the ratio of at least equal molecular weights, or if possible, with excess of O,O-dimethyl chlorothionophosphate. In this case, it is preferable to carry out the reaction in an inert organic solvent by use of almost equimolar quantities of the said two compounds in general. That is, when O,O-dimethyl chlorothionophosphate is mixed with alkali metal 4-cyanophenolate in an inert organic solvent and then heated, a de-alkali metal chloride reaction takes place and the compound of this invention can be produced as the result. When free 4-cyanophenol is utilized in place of the said alkali metal 4-cyanophenolate, the present reaction proceeds according to the so-called de-hydrogen chloride reaction, and in such case, the said reaction may preferably be carried out in the presence of a well known deacidic agent, for example, such organic bases as pyridine and diethyl amino; alkali metal carbonates and alkali metal bicarbonates. The inert organic solvent utilized in the present reaction may include any kind of well known solvent, provided that it does not affect the present reaction, for example hydrocarbon solvents, halogenated hydrocarbon solvents, alcohols, ketones and ethers. Though the present reaction may proceed only by standing the reaction mixture at the room temperature for long period of time, it is in general preferable to heat the mixture, for example at a certain temperature lower than the boiling point of the said solvent. Furthermore, the present reaction is preferably carried out in the presence of catalyst such as copper powder and cuprous salts, in good yield.

When the reaction is over, the precipitated alkali metal chloride or hydrochloric acid salt of organic base is filtered off, or alternatively, adequate quantities of water is added to the reaction mixture to dissolve the by-produced salts and water layer is separated off, and then the organic layer is evaporated in vacuo to obtain the objective compound as a residue. By the above-mentioned procedure, a sufficiently purified compound for most of practical use may be obtained, but, if necessary, thus obtained compound may be further purified by vacuum distillation, column-chromatography, and/or recrystallization at a lower temperature. Generally, as the present compound is accompanied with some extents of decomposition in heating, it may be practical to use without such purification.

Thus obtained O,O-dimethyl-O-(4-cyanophenyl) thionophosphate of the present invention is a pale yellow oily product having such physical properties as a refractive index $n_D^{21.2}$ 1.5457 and B.P. 119–120° C./0.09 mm. Hg (accompanying decomposition), and this compound is very soluble in alcohols, ethers, ketones and aromatic hydrocarbons, hardly soluble in aliphatic hydrocarbons and insoluble in water.

The following is the description on the toxicity of O,O-dimethyl-O-(4-cyanophenyl) thionophosphate of this invention. The toxicity ($LD_{50}$ value) towards mouse of the present compound is compared with that of parathion, varying their administration routes and the results are shown in the coming Table 1.

TABLE 1

| Route | Compound of the invention, mg./kg. | Parathion, mg./kg. |
|---|---|---|
| Oral administration | 920 | 5.8 |
| Subcutaneous administration | 1,080 | 14.2 |
| Intraperitoneal administration | 350 | 5.3 |

The following Table 2 shows the toxic values of the compound of the present invention and of parathion, as well as EPN, by dermal administration route ($LD_{50}$, mg./mouse).

TABLE 2

| Compound of the invention | Parathion | EPN |
|---|---|---|
| >50.0 | 0.48 | 8.7 |

Further, an outstanding characteristic of low toxicity of the present compound will be apparent from the following Table 3. In the Table 3, the toxic values towards mouse and the efficacies and utilities of the compound of the present invention and of the known, practically utilized insecticides are shown.

TABLE 3

| Compound (name) | Oral toxicity towards mouse $LD_{50}$, mg./kg. | Efficacy and utility |
|---|---|---|
| (Parathion) | 6–10 | Effective, and utilized. |
| (Methyl Parathion) | 20–30 | Similar to Parathion, and utilized. |
| (EPN) | 15–20 | Similar to Parathion, and utilized. |

TABLE 3—Continued

| Compound (name) | Oral toxicity towards mouse LD$_{50}$, mg./kg. | Efficacy and utility |
|---|---|---|
| 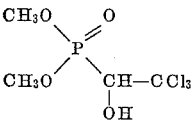 (Dipterex) | 300–400 | Needing 2–3 times amount compared with Parathion, and utilized. |
| 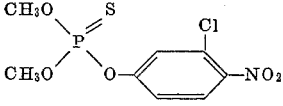 (Chlorthion) | 300–350 | Inferior in efficacy, and not utilized. |
| 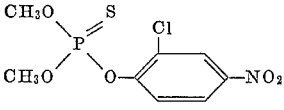 (Dicapthon) | 300–350 | Inferior in efficacy, and not utilized. |
| 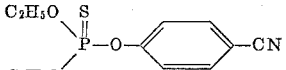 | 10–12 | Similar to Parathion, and not utilized. |
| 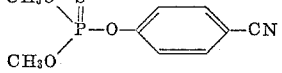 (Compound of the invention) | 900–1,000 | Similar to Parathion, and extremely utilizable. |

O,O-dimethyl-O-(4-cyanophenyl)thionophosphate of the present invention occupies an unique position among other isomers, homologues and analogues of the compound as for the corelation of the toxicity and the insecticidal activity, and these facts are shown in the following Table 4.

TABLE 4

| Compound | Oral toxicity towards mouse, LD$_{50}$ (mg./kg.) | Hibernating larvae of rice stem borer, topical method [1] | | | |
|---|---|---|---|---|---|
| | | 20γ/ larva | 6.7γ/ larva | 2γ/ larva | 0.67γ/ larva |
| 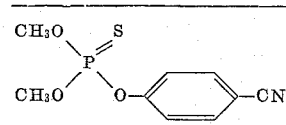 (Compound of the invention) | 900–1,000 | 100 | 100 | 100 | 100 |
| 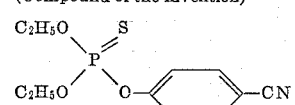 | 7.0 | 100 | 100 | 100 | 80 |
| 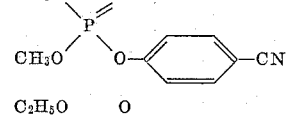 | 50 | 100 | 100 | 100 | 100 |
| 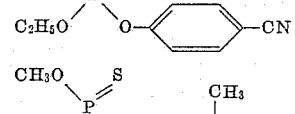 | 10.4 | 100 | 100 | 100 | 100 |
| 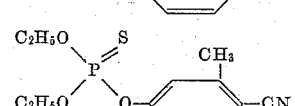 | 560 | 100 | 100 | 100 | 100 |
|  | 7.5 | 100 | 100 | 100 | 40 |

TABLE 4—Continued

| Compound | Oral toxicity towards mouse, $LD_{50}$ (mg./kg.) | Hibernating larvae of rice stem borer, topical method [1] | | | |
|---|---|---|---|---|---|
| | | 20γ/ larva | 6.7γ/ larva | 2γ/ larva | 0.67γ/ larva |
| 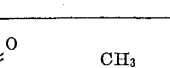 | 26 | 100 | 100 | 100 | 100 |
| 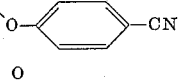 | 10.6 | 100 | 100 | 80 | 30 |
| 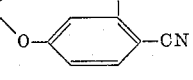 | >1,000 | 10 | 20 | 10 | 20 |

[1] Topical test was conducted by using hibernating larvae of rice stem borer as follows. Each compound was dissolved into acetone to prepare a series of acetone solutions containing from 0.067 to 2% of the said compound (g./cc). Each 1/1000 cc. of the said solution was applied to the body of the larva by means of micrometer syringe and, after keeping it for 3 days at 25° C., its death or survival condition was observed. The larvae utilized in this test had almost the same body weights ranging from 80 to 90 mg. and each solution was applied to a group of these 20 larvae in order to calculate the mean fatal percent.

The following Table 5 shows the comparative efficacies towards rice stem borer of the compound of the invention and of the typical insecticidal compound, parathion, utilized in these days, in more details.

TABLE 5

*Topical Application Towards Hibernating Larvae of Rice Stem Borer* [1]

| | 20γ/ larva | 6.7γ/ larva | 2γ/ larva | 0.67γ/ larva | 0.2γ/ larva |
|---|---|---|---|---|---|
| Compound of the invention | 100 | 100 | 100 | 100 | 80 |
| parathion | 100 | 100 | 100 | 100 | 50 |

[1] See footnote 1, table 4.

*Pot-Test Towards the Second Generated Larvae of Rice Stem Borer (Spraying Towards the Borer Encroaching in a Rice Plant)*

| | | 1/2000 | 1/4000 | 1/8000 |
|---|---|---|---|---|
| Spray 3 days later from the encroachment | Compound of the invention | 100 | 100 | 71.4 |
| | Parathion | 100 | 94.6 | 67.1 |
| Spray 7 days later from the encroachment. | Compound of the invention. | 92.5 | 71.5 | |
| | Parathion | 92.9 | 65.7 | |

Besides rice stem borer, the compound of the present invention also possesses an excellent efficacy towards paddy borer, purplish stem borer and other borers attacking rice plant. While the compound and the composition of the present invention show, as described hereinbefore, an outstanding practicability for the control of borers of rice compared with that of any other conventional insecticides, they further have the superior efficacies towards common agricultural pests belonging to the order such as Lepidoptera, Diptera, Hemiptera, Siphonoptera, Orthoptera and Coleoptera and other various sanitary pests.

In order to make clear the effectiveness of the compound of the present invention towards sanitary pests, Table 6 shows the comparative efficacies towards house fly and its larva (maggot), of the compound and of the conventionally utilized, low toxic insecticides. In this test, an emulsifiable concentrate was prepared by mixing 50 parts by weight of an active ingredient, 40 parts by weight of Triton X-100 and 10 parts by weight of xylene, and the concentrate was diluted with water to make a test emulsion.

TABLE 6

| Compound | Concentration,[1] g./100 cc. | Adult fly,[2] kill percent | Maggot kill,[3] percent | Spraying to generative place [4] | | | | |
|---|---|---|---|---|---|---|---|---|
| | | | | The day | After 1 day | After 2 days | After 3 days | After 4 days |
| Compound of the invention | 0.2 | 98.5 | 84.9 | 100 | 96.4 | 87.2 | 75.3 | 51.1 |
| Malathion | 0.5 | 86.6 | 65.7 | 98.8 | 46.1 | 10.8 | 5.2 | |
| Untreated | | 2.0 | 3.2 | 0 | 0 | 3.2 | 0 | 0.4 |

[1] The concentration, g./100 cc., shows the amounts (g.) of the active ingredient contained in 100 cc. of the test emulsion, and these values shown in this item were adequately chosen so that the kill percent of maggot came to more than 90%.
[2] By means of the settling tower method. (Cf. Bull. Ent. Res. 14, 223 (1924).)
[3] By means of the Beaker method. That is, a culture ground of house fly was settled into a beaker having an inner diameter of about 9 cm. and a height of about 10 cm., and eggs of house fly were blowed thereon. Two days later, 1 cc. of the test emulsion was sprayed on the surface of the ground, and 7 days standing the dead and the survival numbers of the larvae (maggots) were calculated.
[4] About 300 g. of matured culture medium for the larva (maggot) was taken in a dish having an inner diameter of about 15 cm. and a height of about 8 cm., and 5 g. of sugar was added thereto and mixed well. To the dish, which was regarded as an artificial generative place, 1 cc. of the test emulsion was sprayed. After that, adult flies were put therein every day and their vital states were observed. This experiment is concerned with the residual effectiveness of the test compound.

The following Table 7 shows the insecticidal activity of the compound of the invention towards other pests than the above described injurious insects.

TABLE 7

| Pest | Crop | Formulation | Concentration of the actual ingredient (kg./l) | Type of application | Effect |
|---|---|---|---|---|---|
| Chrysanthemum aphid | Chrysanthemum | 50.E. | 1/10,000 | Spray | 100 percent kill. |
| Green peach aphid | Radish | 50.E. | 1/10,000 | do | Do. |
| Green leaf hopper | Rice | 50.E. | 1/2,000 | do | 95 percent kill. |
| Green rice leafhopper | Rice | 50.E. | 1/5,000 | do | 100 percent kill. |

"50.E." means an emulsifiable concentrate containing 50 parts by weight of the compound of the invention, 10 parts by weight of xylene, and 40 parts by weight of Triton X-100 [a polyethylene glycol nonylphenyl ether, made by Rohm & Haas Co.].

In order to put the O,O-dimethyl-O-(4-cyanophenyl) thionophosphate of the present invention into practical use, various inert carriers may be combined therewith to make an insecticidal composition containing a toxic quantity of the said compound. As for the said compositions, such formulations as emulsion, suspension, dust and oil preparations may be included.

The emulsified preparation of the compound of the invention may be prepared, for example, by mixing the compound with an organic solvent and a surface active agent in a proper proportion to make an emulsifiable concentrate and by diluting thus obtained concentrate with water at the time of practical use. As the organic solvent, an aromatic hydrocarbon such as benzene and xylene may preferably be utilized and as the surface active agent, almost all kinds of nonionic surface active agents may successfully be employed. The mixing ratio of these ingredients can freely be selected according to the material to be utilized and to the object of the preparation. However, in general, 50 weight parts of the compound of the present invention may adequately be combined with 10 weight parts of a solvent and 40 weight parts of a surface active agent to obtain a good emulsifiable concentrate. In some cases, the compound of the present invention may be combined merely with a nonionic surface active agent to obtain an emulsifiable concentrate. At the time of practical use, the said concentrate will be diluted with an adequate quantity of water to make emulsion and thus obtained emulsion will be sprayed directly.

In case of wettable powder, the compound of the present invention is mixed with a nonionic surface active agent in an adequate proportion and is further combined with a powdered carrier. As the surface active agent, almost all sorts of nonionic surface active agents may successfully be employed, and as the powdered carrier, such carriers as talc, kaolin, bentonite, diatomaceous earth and Japanese acid clay may be utilized. As for the said powdered carrier, it is preferable to use such a carrier as having more than 200 mesh's particle size. The mixing ratio of these ingredients in the said wettable powder can preferably be determined so as to contain from 5 to 25 weight percent of the compound of the present invention, from 5 to 10 weight percent of the surface active agent and the remaining weight percent of the powdered carrier, but these ratio may freely be varied in accordance with the application objects of the preparation. A suitable suspension for practical use may easily be prepared from the said wettable powder merely by putting them into water.

When an adequate amount of the present compound is admixed with a powdered carrier, a dust formulation may be obtained. In this case, it may be prepared by admixing the both parties directly, but preferably, the compound of the present invention may be dissolved into a solvent having a lower boiling point, and admixed with the carrier, followed by distillation of the solvent to obtain the dust formulation. In the said dust formulation, it is preferable to contain from 1 to 5% by weight of the compound of the invention. As for the carrier, such material as already described under the item of the wettable powder as the powdered carrier may successfully be utilized.

Further, the compound of the invention may be dissolved into such a solvent as deodorized kerosene to make a oil preparation having a proper concentration. The solubility of the present compound to kerosene is considerably so poor that one may use at the same time a co-solvent in case of need. As for the said co-solvent, such aromatic hydrocarbon solvent as benzene, xylene and methylnaphthalene may preferably be employed.

As for the manufacturing method of the insecticide containing the compound of this invention, besides the above described recipes, it would be apparently known to those skilled in the art that any recipe might be utilized according to the common methods for preparing organo phosphorus insecticides. Moreover, the insecticidal compositions of the present invention may satisfactorily be compounded with other material such as an active ingredient of another type of insecticide, a fungicidal and an herbicidal component so far as it is compatible with the compound of the invention.

When the above described insecticidal composition of the present invention is practically utilized for the purpose of killing noxious insects, the said composition is applied to the insects in such a way as an insecticidal quantity of O,O-dimethyl-O-(4-cyanophenyl) thionophosphate of the present invention may come into contact with the objective insects. For example, in case of using 50% emulsifiable concentrate, it may be enough for the substantially perfect kill of borers of rice to employ from 70 to 80 liters of 1/2000 diluted emulsion per 10 ares towards the first generated larvae and to employ from 90 to 180 liters of 1/1000 diluted emulsion per 10 ares towards the second generated larvae. In case of dust formulation containing 1.5% of the compound of the present invention, from 3 to 4 kg. of the said dust per 10 ares may advantageously be applied towards the first generated larvae of borers of rice and from 5 to 6 kg. per 10 ares may be enough towards the second generated larvae. And in case of using wettable powder containing 25% of the compound of the invention, the following ratio may be adequate for the control of borers of rice, 70–80 liters of 1/1000 aqueous suspension of the said wettable powder per 10 ares towards the first generated larvae and 90–180 liters of 1/500 aqueous suspension per 10 ares towards the second generated larvae of borers of rice.

The present invention will be illustrated by the following examples, without, however, being limited thereto. Unless otherwise provided, all parts are represented by weights.

*Example 1.*—To a mixture of 23.8 g. of 4-cyanophenol and 27.6 g. of anhydrous potassium carbonate in 200 cc. of methyl isobutyl ketone, 32.2 g. of O,O-dimethyl chlorothionophosphate was added drop by drop at 60° C. under stirring. After the dropping of the phosphate is over, stirring of the mixture was further continued for 8 hours at 60–80° C. to complete the reaction. Water was added to dissolve the precipitated inorganic compound, and organic layer was separated, washed with water and dried over anhydrous sodium sulfate. After distilling off the methyl isobutyl ketone in vacuo, 45.2 g. of reddish brown oil product was obtained. For further purification, the crude product was subjected to column-chromatography using active carbon and active alumina, obtaining a pale yellow oily product having a refractive index $n_D^{21.2}$ 1.5457.

*Analysis.*—Calculated (for $C_9H_{10}NO_3PS$): P, 12.8; S, 13.2; N, 5.76%. Found: P, 12.7; S, 13.0; N, 5.68%.

*Example 2.*—To a mixture of 23.8 g. of 4-cyanophenol, 32.2 g. of O,O-dimethyl chlorothionophosphate, and 0.1 g. of cuprous chloride in 100 ml. of toluene heated at 60° C., there was added 27.6 g. of anhydrous potassium carbonate in small portions. The water resulting during the reaction is distilled off by azeotrope with the toluene together with the resulting carbon dioxide. After completion of the reaction, the reaction product is treated by the same procedure with that of Example 1, yielding almost the same amount of the objective product.

*Example 3.*—The procedure of Example 1 was repeated except that the corresponding amount of sodium 4-cyanophenolate was employed in place of 4-cyanophenol and anhydrous potassium carbonate, and that chlorobenzene was utilized as the solvent instead of the methyl isobutyl ketone. The same result was obtained as that of the preceding examples.

*Example 4.*—Fifty parts of O,O-dimethyl-O-(4-cyanophenyl) thionophosphate was combined with 40 parts of Triton X-100 (a polyethylene glycol nonylphenyl ether, made by Rohm & Haas Co., U.S.A.) and 10 parts of xylene in the described order to make an uniform emulsifiable concentrate. The rice plants after 20 days from their sowing were transplanted into the Wagner-pot having a surface area of 1/50,000 of 10 ares, each four plants a pot. After 2 months, these plants were infested with rice stem borers and, 3 days later from the encroachment of the pests, 10 cc. of 1/1000 diluted emulsion of the said 50% emulsifiable concentrate was sprayed per pot. Almost 100% of the borers encroaching in the stems were killed in 3 days.

*Example 5.*—One and a half parts of O,O-dimethyl-O-(4-cyanophenyl) thionophosphate was dissolved into 20 parts of acetone and the acetone solution was thoroughly admixed with 98.5 parts of 200 mesh's talc. Evaporation of the solvent gave 1.5% dust formulation. To the rice plants having the same conditions with that of Example 1, eggs of rice stem borers were applied and 3 days later from their encroachment the pot was settled into the belljar duster, sprayed with 0.2 g. of the said dust, taken out after 30 minutes, and left alone. Almost 100% of the borers encroaching in the stem were killed in 3 days.

*Example 6.*—Thirty parts of O,O-dimethyl-O-(4-cyanophenyl) thionophosphate and 10 parts of Triton X-100 were mixed thoroughly each other and the combined mixture was added dropwise into 60 parts of 200 mesh's talc in a ball mill and mixed therewith to obtain a wettable powder. To the rice plants having the same conditions with that of Example 1, eggs of rice stem borers were applied and after 3 days from their encroachment 10 cc. of 1/600 aqueous suspension of the said wettable powder was sprayed per pot. Almost 100% of the borers encroaching in the stem were killed in 3 days.

*Example 7.*—One and one half parts of O,O-dimethyl-O-(4-cyanophenyl) thionophosphate was dissolved in 20 parts of Versicol AR-50 (a kind of aromatic hydrocarbon solvent manufactured by Versicol Corp., U.S.A.) and to the mixture 78.5 parts of Deobase (deodorized hydrocarbon solvent manufactured by L. Sonneborn & Sons, Inc., U.S.A.) was added to obtain an oil preparation. When 60 cc. of the said oil was sprayed on one square meter of the favorite haunt of flies such as a dumping ground, almost 100% of the fly maggots growing within the said place were killed in 48 hours.

We claim:
1. O,O-dimethyl-O-(4-cyanophenyl) thionophosphate.
2. An insecticidal composition comprising an inert carrier and as the essential active ingredient O,O-dimethyl-O-(4-cyanophenyl) thionophosphate.
3. An insecticidal composition comprising an emulsion of a toxic quantity of O,O-dimethyl-O-(4-cyanophenyl) thionophosphate.
4. An insecticidal composition comprising an aqueous suspension of a wettable powder containing a toxic quantity of O,O-dimethyl-O-(4-cyanophenyl) thionophosphate.
5. A method of killing insects which comprises contacting the insects with an insecticidal quantity of O,O-dimethyl-O-(4-cyanophenyl) thionophosphate.
6. A method of killing borers of rice which comprises contacting the borers of rice with an insecticidal quantity of O,O-dimethyl-O-(4-cyanophenyl) thionophosphate.
7. A method of killing house fly which comprises contacting the house fly with an insecticidal quantity of O,O-dimethyl-O-(4-cyanophenyl) thionophosphate.
8. A method of killing larva of house fly which comprises contacting the larva of house fly with an insecticidal quantity of O,O-dimethyl-O-(4-cyanophenyl) thionophosphate.

References Cited in the file of this patent

UNITED STATES PATENTS

| | | |
|---|---|---|
| 2,664,437 | Fletcher | Dec. 29, 1953 |
| 2,784,207 | Geoghegan | Mar. 5, 1957 |

OTHER REFERENCES

Schrader: "Angew. Chem.," vol. 73, pp. 331–334 (May 1961).

Schrader: "Die Entwicklung neue Insekticid auf Grundlage organischer Fluor und Phosphor-Verbindungen," Verlag Chemie, GMBH (1952) p. 59.

Metcalf: "Orangic Insecticides," Interscience Publishers, Inc. (1955), p. 292.